(12) United States Patent
de los Reyes

(10) Patent No.: US 9,116,614 B1
(45) Date of Patent: Aug. 25, 2015

(54) DETERMINING POINTER AND SCROLL GESTURES ON A TOUCH-SENSITIVE INPUT DEVICE

(75) Inventor: Andrew de los Reyes, Belmont, CA (US)

(73) Assignee: GOOGLE INC., Mountain View, CA (US)

( * ) Notice: Subject to any disclaimer, the term of this patent is extended or adjusted under 35 U.S.C. 154(b) by 83 days.

(21) Appl. No.: 13/441,778

(22) Filed: Apr. 6, 2012

Related U.S. Application Data

(60) Provisional application No. 61/475,209, filed on Apr. 13, 2011.

(51) Int. Cl.
*G06F 3/0488* (2013.01)
*G06F 3/02* (2006.01)

(52) U.S. Cl.
CPC .......... *G06F 3/04883* (2013.01); *G06F 3/0202* (2013.01)

(58) Field of Classification Search
CPC ... G06F 3/0488; G06F 3/04883; G06F 3/044; G06F 3/04886; G06F 3/045
USPC ................................ 345/173–181, 156, 169; 178/18.01–18.09
See application file for complete search history.

(56) References Cited

U.S. PATENT DOCUMENTS

| 2005/0223308 | A1* | 10/2005 | Gunn et al. ................... 715/500 |
| 2006/0038796 | A1* | 2/2006 | Hinckley et al. .............. 345/173 |
| 2008/0040692 | A1* | 2/2008 | Sunday et al. ................ 715/863 |
| 2008/0106524 | A1* | 5/2008 | Chiu et al. .................... 345/173 |
| 2008/0165141 | A1* | 7/2008 | Christie ........................ 345/173 |
| 2012/0185801 | A1* | 7/2012 | Madonna et al. ............. 715/834 |

\* cited by examiner

*Primary Examiner* — Shaheda Abdin

(57) ABSTRACT

Aspects of the subject technology relate to determining whether finger movements detected by a touch-sensitive input device are intended to be a pointer gesture or a scroll gesture. Movements may be categorized as a pointer gesture or a scroll gesture based on one or more factors such as the number of fingers detected, differences between the fingers, the alignment of the fingers, the distance between fingers, the location of the fingers, the area of contact with the surface of the input device for each finger, and the movement of the fingers. In one aspect, after an initial determination is made about whether finger movements are pointer gestures or scroll gestures, further movements may be detected and used to determine whether to correct the initial determination.

20 Claims, 7 Drawing Sheets

DETERMINING POINTER AND SCROLL GESTURES ON A TOUCH-SENSITIVE INPUT DEVICE

RELATED APPLICATION

This application claims priority to U.S. Provisional Patent Application No. 61/475,209, filed on Apr. 13, 2011, entitled "DETERMINING POINTER AND SCROLLING INTENT ON A TOUCH-SENSITIVE INPUT DEVICE," the entire contents of which are herein incorporated by reference in its entirety.

FIELD

The present disclosure generally relates to determining user intent and to tracking user movements on a touch-sensitive input device.

BACKGROUND

A user may input commands to a computing system (e.g., laptop) via a touch-sensitive input device (e.g., a touchpad or trackpad). For example, the user may move a finger across the surface of the input device to scroll a page or move a pointer displayed on the computing system. In this example, the input device may be used to track movements of the user's finger on the surface of the input device by frequently detecting the position (e.g., (x,y) coordinates) of the user's finger on the surface of the input device as the user's finger moves across the surface. The computing device may implement gesture recognition software that translates the detected positions of the user's finger into a gesture (e.g., pointer movement, scroll, etc.).

SUMMARY

Aspects of the subject technology relate to a computer-implemented method for determining a gesture on a touch-sensitive input device. The method may include starting a delay period in response to a state change event, receiving a frame of data comprising information from a touch-sensitive input device, and reporting an initial gesture determination, wherein the initial gesture determination is based on the frame of data. The method may further include receiving at least one additional frame of data and reporting a final gesture determination when the delay period expires, wherein the final gesture is based on the at least one additional frame of data.

Additional aspects of the subject technology relate to a system for determining a gesture on a touch-sensitive input device. The system may include one or more processors and a machine-readable medium comprising instructions stored therein, which when executed by the one or more processors, cause the one or more processors to perform operations. The operations may include starting a delay period in response to a state change event, receiving a frame of data comprising information from a touch-sensitive input device, and reporting an initial gesture determination, wherein the initial gesture determination is based on the frame of data. The operations may further include receiving at least one additional frame of data, and reporting, subsequent to the reporting of the initial gesture determination, a final gesture determination when the delay period expires, wherein the final gesture is based on the at least one additional frame of data.

Aspects of the subject technology may also relate to a machine-readable medium comprising instructions stored therein, which when executed by a machine, cause the machine to perform operations for determining a gesture on a touch-sensitive input device. The operations may include receiving a frame of data comprising information from a input device, reporting an initial gesture determination, wherein the initial gesture determination is based on the frame of data, receiving at least one additional frame of data, and reporting, subsequent to the reporting of the initial gesture determination, a final gesture determination.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, a system may be configured to determine whether finger movements detected by a touch-sensitive input device (e.g., a touchpad, a touch-sensitive display, or a tablet device) are intended to be a pointer gesture or a scroll gesture are provided. In one aspect, movements may be categorized as a pointer gesture or a scroll gesture based on one or more factors such as the number of fingers detected, differences between the fingers, the alignment of the fingers, the distance between fingers, the location of the fingers, the area of contact with the surface of the input device (e.g., a "capacitance" or "pressure") for each finger, and/or the movement of the fingers.

Figure 1:
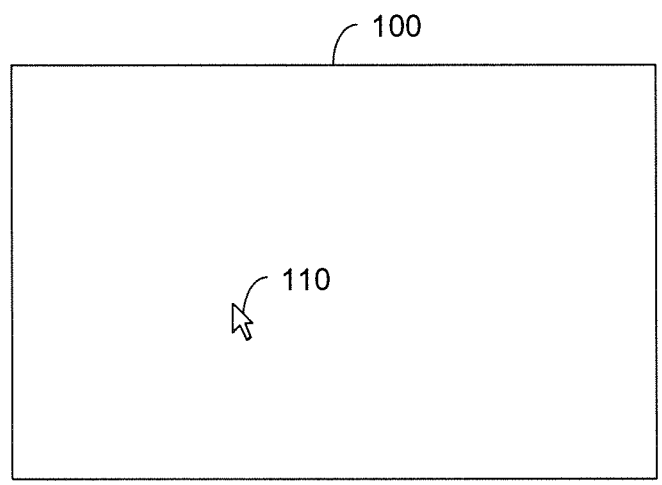
FIG. 1 is an example user interface showing a pointer, in accordance with one aspect of the subject technology.

A pointer gesture is a movement detected by the touch-sensitive input device that is intended to move a pointer (e.g., a cursor) in a graphical user interface. The pointer may be used in the graphical user interface to, among other things, select or move interface elements or indicate a position in the graphical user interface. FIG. 1 is an example user interface 100 showing a pointer 110, in accordance with one aspect of the subject technology. In FIG. 1, the pointer 110 appears as an angled arrow, however, in other implementations pointers may appear as different symbols depending on the application, operating system, or device.

A scroll gesture is a movement detected by the touch-sensitive input device that is intended to move a user interface element (e.g., text, images, video, the contents of a window) across a screen or window. In some cases, a scroll gesture is used to slide contents of a window into view when all the contents of the window cannot be displayed simultaneously. Although scrollbars may be used to scroll a window, users may choose to use a scroll gesture on a touch-sensitive input device instead.

A user may make a pointer gesture on a touch-sensitive input device by moving the tip of a single finger across the surface of the touch-sensitive input device. To make a scroll gesture, the user may move the tips of two fingers across the surface of the input device within close proximity to one another, in the same direction, and at the same time and speed. Distinguishing between the two gestures, however, is sometimes difficult as the information captured by the touch-sensitive input device may not always be clear or may be obscured by other signals such as an inadvertent thumb or palm resting on the touch-sensitive input device.

In some cases, a more accurate determination as to whether a user intends a scroll gesture or a pointer gesture may be made by analyzing the movement detected by the touch-sensitive input device for a longer period of time. However, waiting for the longer period of time may diminish responsiveness.

Accordingly, in one aspect of the subject technology, an initial determination as to whether the user intends a scroll gesture or a pointer gesture may be made. After the initial determination is made, subsequent movements may be detected and used to determine whether to correct or otherwise modify the initial determination. To this end, in one aspect, one or more timers or counters may be used to define a delay period of time in which additional information may be collected and used to make a final determination.

Figure 2:
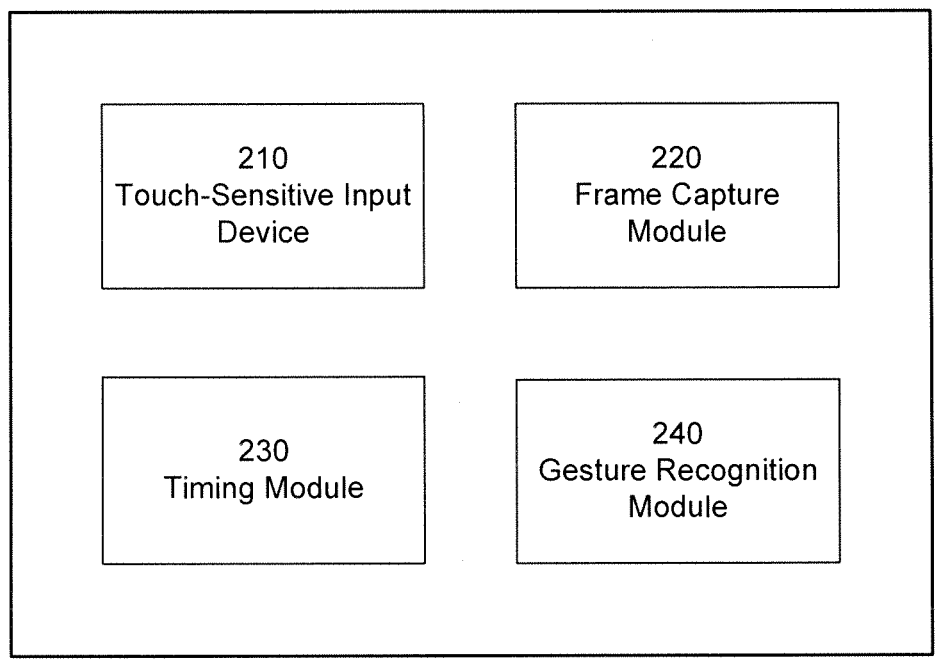
FIG. 2 is a block diagram illustrating an example system configured to track user movements on a touch-sensitive input device, according to certain aspects of the subject technology.

FIG. 2 is a block diagram illustrating an example system 200 configured to track user movements on a touch-sensitive input device, according to certain aspects of the subject technology. The system 200 may include a touch-sensitive input device 210, a frame capture module 220, a timing module 230, and a gesture recognition module 240.

In one configuration, the touch-sensitive input device 210 may be a touchpad that is configured to detect the presence of one or more appendages (e.g., fingers, palms, elbows, etc.) on a surface of the touch-sensitive input device 210 and determine the position of the detected appendages. For example, the touch-sensitive input device 210 may detect that an area on its surface is in contact with a user's appendage and convert the contacted area into coordinates (e.g., (x,y) coordinates) and output the coordinates to the frame capture module 220.

The frame capture module 220 may intermittently or periodically capture the output of the touch-sensitive input device 210 and store the information in a "frame" that represents the state of the touch-sensitive input device 210 at a particular moment in time. For example, each frame may include information indicating that, at a particular moment in time, one or more areas of the touch-sensitive input device 210 were in contact with a user's appendages such as a finger. Thus, each frame may provide a "snapshot" of the position of fingers on the surface of the touch-sensitive input device 210

A number of frames may be sequentially captured and analyzed in order to detect movement of fingers from one location on the surface of the touch-sensitive input device 210 to another. In order to maintain proper order of the frames, each frame may include additional information, such as a sequential identifier or a timestamp.

According to one aspect, the frame capture module 220 may periodically capture the frames at a rate of 80 frames per second. However, the subject technology is not limited to this frame rate. The frame rate may vary depending on the settings of the touch-sensitive input device 210, the capabilities of the touch-sensitive input device 210, an operating system, and/or other factors.

The movement of a finger on the surface of touch-sensitive input device 210 may be inferred by the number of fingers detected by the touch-sensitive input device 210, the area of contact with the surface of the touch-sensitive input device 210 (e.g., "capacitance") for each finger, the width of area of contact corresponding to each finger, the shape and orientation of each detected touch or finger (e.g., the shape may be indicated by a major and minor radius that describe an ellipse and orientation may be an angle between 0 and 180 degrees), and comparing the respective detected positions of the fingers in consecutive frames.

Figure 3B:
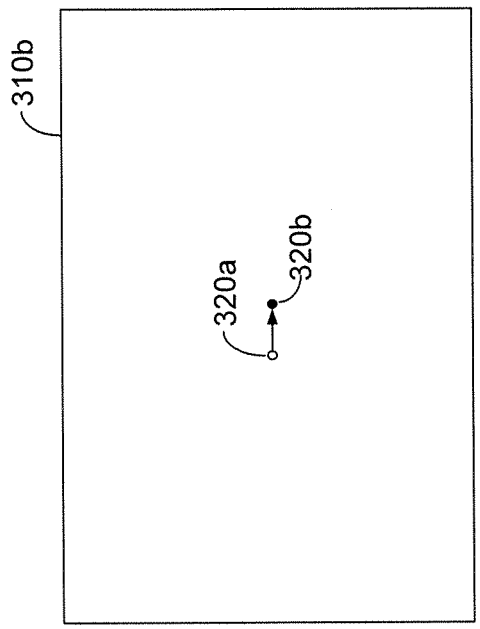
FIG. 3B is a diagram showing an example frame, according to one aspect of the subject technology.
Figure 3A:
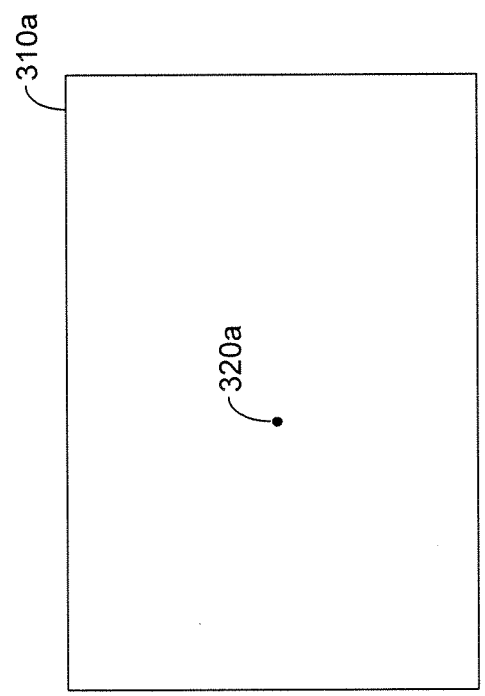
FIG. 3A is a diagram showing an example frame, according to one aspect of the subject technology.

FIG. 3A and FIG. 3B are diagrams, each showing an example frame, according to one aspect of the subject technology. Together, FIGS. 3A and 3B show spatial representations of detected positions 320a and 320b of a finger on the surface of the touch-sensitive input device 210 from two consecutive frames 310a and 310b. In this example, only one finger is detected in each frame for ease of illustration, although it is to be understood that multiple fingers may be detected in each frame.

FIG. 3B shows the detected position 320b of the finger from a current frame 310b and FIG. 3A shows the detected position 320a of the finger from the preceding frame 310A. FIG. 3B also shows the previously detected position 320a of the finger (shown as an open circle) relative to the detected position 320b of the finger in the current frame 310b. As shown in FIGS. 3A and 3B, the detected position 320b in the current frame 310b is located to the right of the detected position 320a in the preceding frame 310a. By comparing the positions 320a and 320b of the finger in the two frames 310a and 310b, the gesture recognition module 240 may infer that the finger moved from left to right on the surface of the touch-sensitive input device 210 between frames (indicated by the arrow in FIG. 3B).

The gesture recognition module 240 may be configured to translate the movements of the fingers on the surface of the touch-sensitive input device 210 into one or more gestures. For example, a number of sequential frames may indicate that a gesture made by a user should be categorized as a pointer gesture or a scroll gesture. After a determination of what gesture the movements detected by the touch-sensitive input device 210 is made, the gesture recognition module 240 may report the gestures to an operating system or application so that the operating system or application may move a cursor on a display or scroll an interface on a display The determination of whether a gesture made by a user is a pointer gesture or a scroll gesture may be made by the gesture recognition module 240 based on one or more factors such as the number of fingers detected, differences in the characteristics of the fingers, the alignment of the fingers, the distance between fingers, the location of the fingers, the size of the area of contact with the surface of the touch-sensitive input device 210 (e.g., "capacitance") for each finger, and/or the movement of the fingers.

According to one aspect, the gesture recognition module 240 may identify and distinguish between two or more fingers detected by the touch-sensitive input device 210 by assigning identifiers (e.g., ID numbers) to each finger. By assigning identifiers to fingers detected by the touch-sensitive input device 210, the gesture recognition module 240 is able to identify which detected positions in different frames belong to the same finger, and therefore track the movements of a particular finger even if more than one finger is detected.

The timing module 230 in FIG. 2 may be configured to define one or more time periods for detecting finger movements and making determinations as to whether the finger movements are pointer gestures or scroll gestures. According to one aspect, the timing module 230 may use timers or counters to monitor the time periods.

For example, a timer may be configured to measure a predetermined period of time. The timer may be started after the timing module 230 detects a state change. A state change may occur when the number of fingers detected by the input device 210 changes or the fingers detected by the input device 210 changes. When the timer expires, indicating that the period of time has elapsed, the gesture module 240 may be instructed to report a gesture determination (e.g., a scroll gesture or a pointer gesture) so that the cursor on a display may be moved or an interface on a display may be scrolled.

In another example, when a state change is detected in a frame by the gesture module 240 a counter may be used to count a number of subsequent frames captured by the frame capture module 220. After the subsequent frames have been captured, the gesture module 240 may be instructed to report a gesture determination based on the captured frames.

Figure 4:
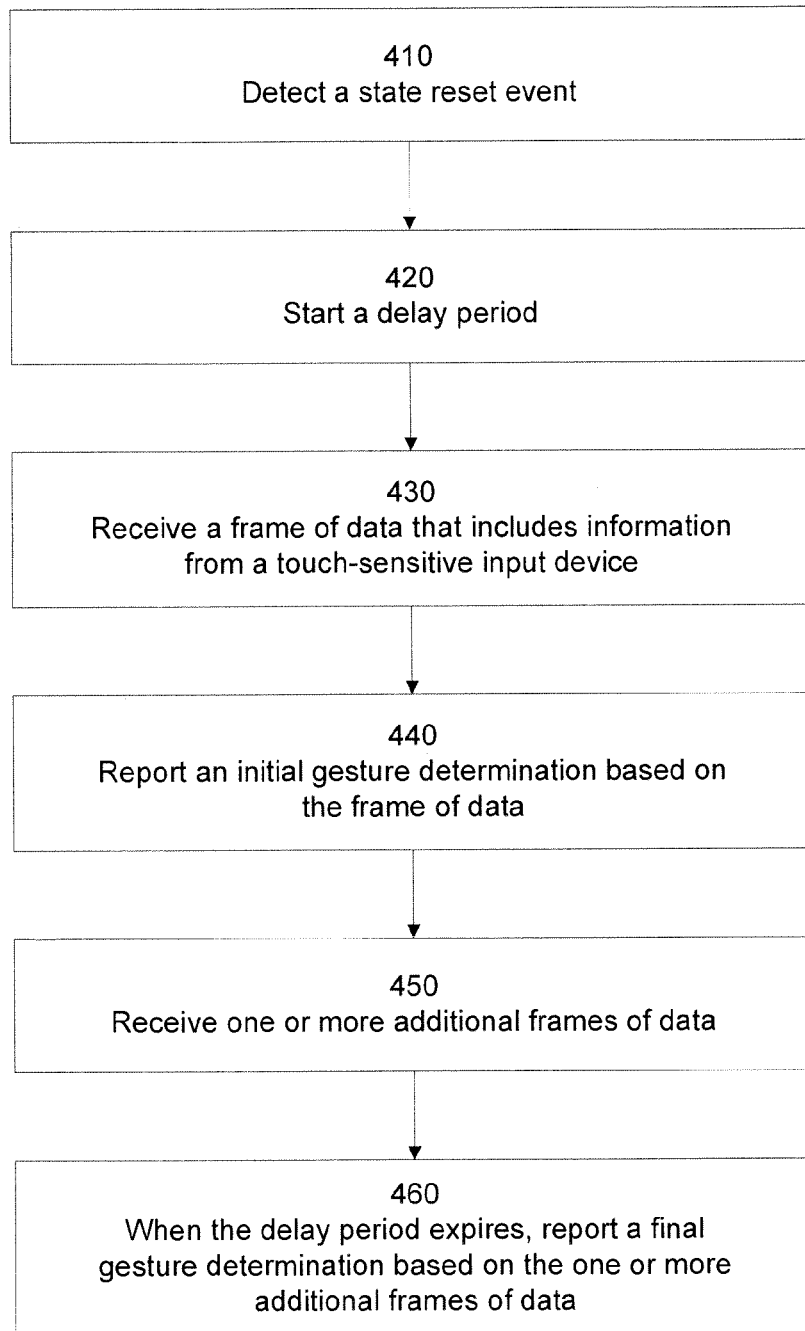
FIG. 4 is a flowchart illustrating an example process for determining a gesture on a touch-sensitive input device, according to one aspect of the subject technology.

FIG. 4 is a flowchart illustrating an example process 400 for determining a gesture on a touch-sensitive input device, according to one aspect of the subject technology. Although the steps in FIG. 4 may be discussed with respect to the components of system 200 illustrated in FIG. 2, the steps are not limited to these modules. Furthermore, although the steps are shown in one particular order, other orderings of steps are also possible. For example other orderings may include additional steps, fewer steps, or steps that occur in parallel.

As mentioned above, the signals detected by the input device 210 and captured by the frame capture module 220 may not always be clear or may sometimes be obscured by other signals detected by the input device 210. For example, a user's palm or thumb may inadvertently come in contact with the input device 210 while a user is using the input device 210. As a result, it may seem as if two or more fingers are detected by the input device 210 rather than one finger and the palm. In another example, although a user intends to use a scroll gesture with the tips of two fingers, the fingers may not come into contact with the input device 210 at the same time (e.g., one finger may come in contact fractions of a second before a second finger comes in contact with the input device 210) or move at the same speed initially.

A more accurate decision may be made by collecting more information before making a final determination as to which gesture is being detected by the touch-sensitive input device 210. According to one aspect, in order to remain responsive and provide a quick gesture determination, a system may report an initial gesture determination, analyze additional data, and at a later time, provide a subsequent gesture determination or a final gesture determination which may or may not be different from the initial gesture determination.

For example, process 400 in FIG. 4 may begin when a state change event is detected at step 410 in a frame of data from a touch-sensitive input device 210. A state change events may include a change in the number of fingers detected by the input device 210 (e.g., no fingers detected to one finger detected), a change in the fingers detected by the input device 210 (e.g., a finger changing to a thumb or palm), after a predetermined amount of time as elapsed, when no state change event has been detected for a certain period of time, or some other event that would create a need to determine a gesture detected by the input device 210.

At step 420, the timing module 230 may start a delay period in response to the detected state change event. The delay period may be measured using a timer that measures an amount of time (e.g., 100 milliseconds) or a counter that counts a number of frames captured by the frame capture module 220. The delay period may represent an amount of time that the system may have in which to make a final determination of a gesture being detected by the touch-sensitive input device 210 and report it to an operating system or other application.

At step 430, the gesture recognition module 240 may receive a frame of data that includes information from the touch-sensitive device 210. The frame of data may be the frame of data that caused the state change event or a subsequently captured frame of data. Using the received frame of data (and possibly other frames of data) the gesture recognition module 240 may make an initial gesture determination and report the initial gesture determination to an operating system or other application at step 440.

After the initial gesture determination is made, at step 450, one or more additional frames of data may be received and used to make additional gesture determinations. At step 460, when the delay period expires, the gesture recognition module 240 may stop making additional gesture determinations and the final determined gesture may be locked in. In some cases, the final gesture determination may be read by an operating system or other application or reported to the operating system or other application.

By first reporting an initial gesture determination, an operating system or application may be enabled to provide a quick response to the gesture a user makes on the touch-sensitive input device 210. Furthermore, by continuing to make a gesture determination based on additional information, the gesture recognition module 240 is able to provide a more accurate gesture determination. According to one aspect, after the final gesture determination is made, no further gesture determinations may be reported until the next state change event is detected.

A gesture determination may be based on a number of factors such as the number of fingers detected, differences between the fingers, the alignment of the fingers, the distance between fingers, the location of the fingers, the area of contact with the surface of the input device (e.g., "capacitance") for each finger, and the movement of the fingers. Two of the gestures that may be identified may be a scroll gesture and a pointer gesture.

Various decision processes and various factors may be used to determine whether contact detected by a touch-sensitive input device 210 is a scroll gesture or a pointer gesture. A few of the decision factors and considerations are listed below. For example, if only one finger is detected, the finger movement is likely to be a pointer gesture.

If two fingers are detected within close proximity to one another, moving in a similar direction, and moving at a similar speed, the finger movements are likely to be a scroll gesture. If, on the other hand, two fingers are detected but separated by over a threshold amount, the finger movements are likely to be a pointer gesture because one of the fingers may inadvertently be in contact with the surface of the input device 210 or the finger may actually be another object (e.g., a piece of paper, a pen, etc.).

If one relatively still finger is detected near the bottom of the input device 210 while another moving finger is detected, the relatively still finger may actually be a thumb or palm accidentally on the input device 210 and the movement of the moving finger is likely to be a pointer gesture. If there are two fingers detected, but there is a large difference in capacitance between the two fingers, one finger (e.g., the finger associated with the larger pressure area) is likely to actually be a thumb or palm that is inadvertently in contact with the surface of the input device 210. As a result, the finger movement is likely to be a pointer gesture.

If two horizontally aligned fingers are detected, the finger movements are more likely to be a scroll gesture. If two vertically aligned fingers are detected, the finger movements may be more likely to be a pointer gesture.

Figure 5:
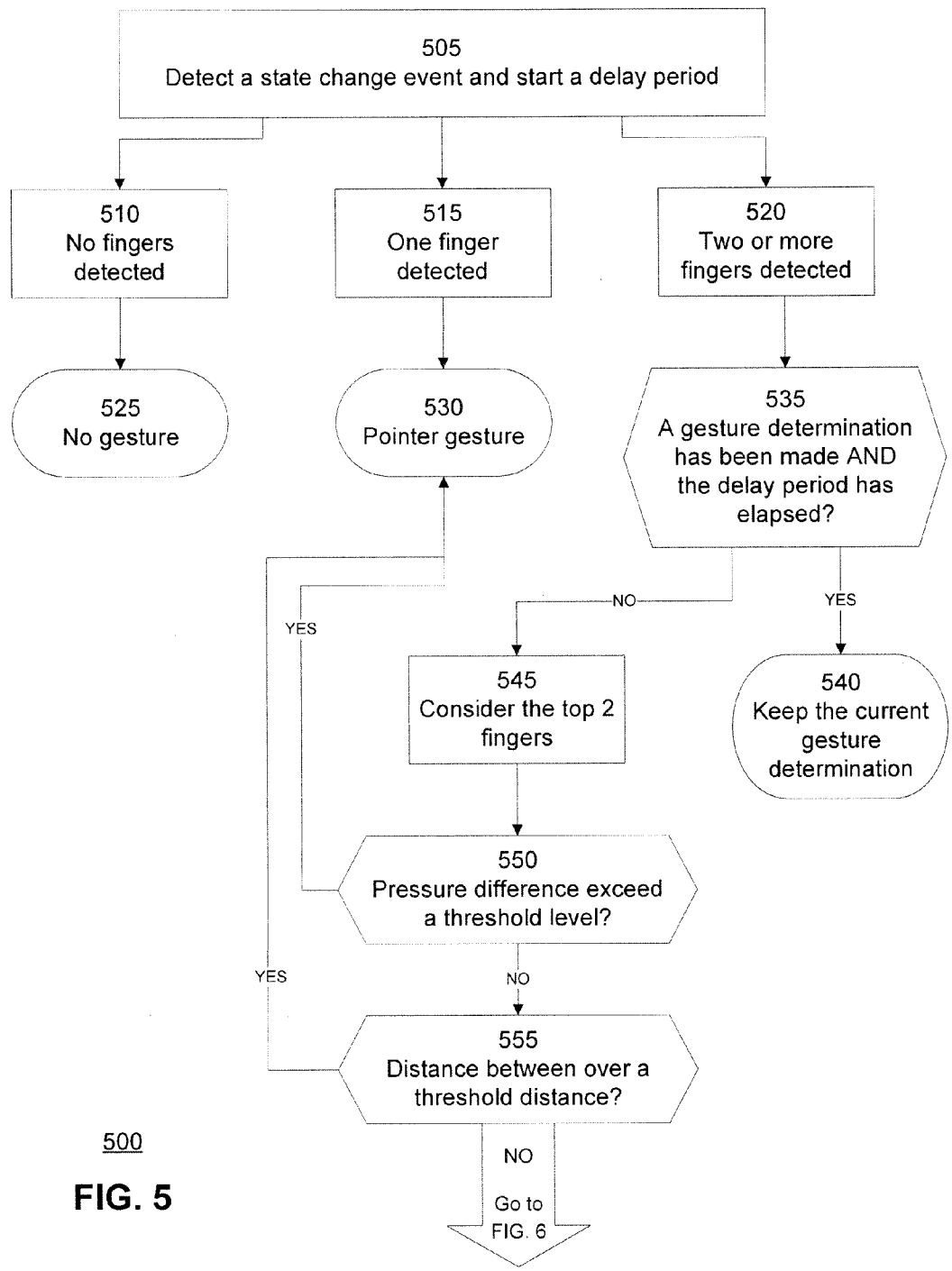
FIG. 5 is a flowchart illustrating an example process for determining a gesture on a touch-sensitive input device, according to one aspect of the subject technology.

FIG. 5 is a flowchart illustrating an example process 500 for determining a gesture on a touch-sensitive input device, according to one aspect of the subject technology. Although the steps are shown in one particular order, other orderings of steps are also possible. For example other orderings may include additional steps, fewer steps, or steps that occur in parallel.

The process 500 shown in FIG. 5 may be used to determine whether finger movements detected by a touch-sensitive input device 210 are intended to be a pointer gesture or a scroll gesture according to certain aspects of the disclosure. A system may be prompted to make a gesture determination in response to a state change event. Accordingly, at step 505, when a state change event is detected, the system may start a delay period.

The delay period gives the system a period of time to make a final determination which enables the system to make a more accurate determination. For example, a user intending to make a scroll gesture may not put his two fingers on the touch-sensitive input device 210 (e.g., the touchpad) at exactly the same moment. Instead only one finger may be detected at first, however, before the delay period expires, the second finger may be detected and the system may determine correctly that the user intended to make a scroll gesture.

The delay period may vary and be adjusted to improve accuracy and/or performance. For example, the delay period may be 30 milliseconds or 100 milliseconds. According to one aspect, a predetermined number of frames captured by the frame capture module 220 may be used instead of a predetermined amount of time.

According to one aspect, the gesture determination module 240 may obtain a frame of data and determine the number of fingers detected by the touch-sensitive input device 210. If no fingers are detected at step 510, the gesture determination module 240 may determine that there is no scroll gesture or pointer gesture being exhibited. In response, the gesture recognition module 240 may do nothing or report to an operating system a "no gesture" gesture determination at step 525. If one finger is detected at step 515, the user is most likely attempting to use the input device 210 to move a cursor (e.g., pointer gesture) since a scroll gesture requires two fingers. Accordingly, the gesture recognition module 240 report to an operating system a "pointer gesture" determination at step 530.

If there are two or more fingers detected by the input device 210 at step 520, the gesture recognition module 240 may determine whether a previous gesture determination has been made and the delay period has elapsed at step 535. If there is a previously made gesture determination and the delay period has elapsed, the previous gesture determination should be a final gesture determination. Accordingly, at step 540, the system may report the previously made gesture determination if it has not been reported already.

If not, there are at least two appendages in contact with the surface of the touch-sensitive input device 210 that the system assumes to be fingers. At step 545, only the top 2 fingers are considered because, in some cases, fingers that are detected at the bottom of the touch-sensitive input device 210 may be other objects (e.g., palms, papers, etc.) or unintentionally placed fingers.

The gesture recognition module 240 may calculate a capacitance (e.g., a pressure level) for each of the top 2 fingers. The capacitance for each finger may be calculated by measuring the area of contact between the finger and the touch-sensitive input device 210. At step 550, if the difference between the capacitances of the two fingers exceed a threshold level for the capacitances.

If the capacitance difference exceeds the threshold level, one of the fingers is more likely to be an errant thumb or palm. As a result, the gesture recognition module 240 may determine that the user most likely intends the finger movement to be a pointer gesture and at step 530, report a pointer gesture determination. According to one aspect, the threshold level for the difference in capacitances may be set based on empirical data and/or the area of the surface of the input device 210. The threshold level for the difference in capacitances may also be based on user data.

If the capacitance difference between the two fingers do not exceed the threshold level for the difference in capacitances, the gesture recognition module 240 may determine whether the distance between the two fingers exceeds a threshold distance. The threshold distance between the two fingers may be determined based on empirical data, user data, and/or the area of the surface of the input device 210. If the distance between the two fingers exceeds the threshold distance, the finger movements are more likely to be intended as a pointer gesture. Accordingly, at step 530, the gesture recognition module 240 may set report a pointer gesture determination.

Figure 6:
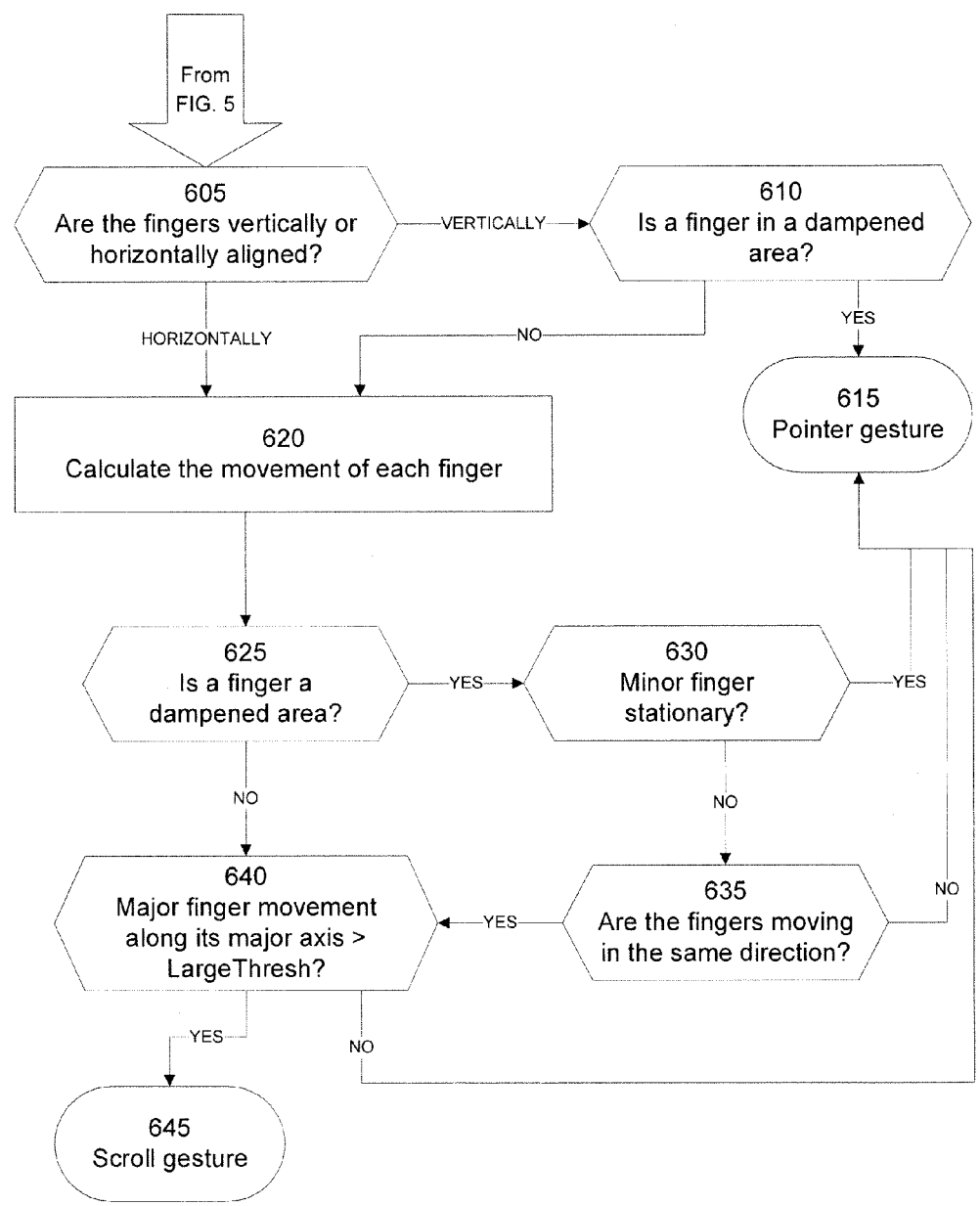
FIG. 6 is a flowchart illustrating an example process for determining a gesture on a touch-sensitive input device, according to one aspect of the subject technology.

FIG. 6 is a flowchart illustrating an example process 600 for determining a gesture on a touch-sensitive input device, according to one aspect of the subject technology. If the distance between the two fingers does not exceed the threshold distance, the process may continue at step 605 as shown in FIG. 6. At step 605, the gesture recognition module 240 may determine whether the two fingers are vertically or horizontally aligned. For example, if one finger is predominantly above another finger, the fingers are vertically aligned. If one finger is predominantly to the side of another finger, the fingers are horizontally aligned.

If the fingers are horizontally aligned, their movement are likely intended as a scroll gesture, however, further analysis may be conducted to increase confidence in the hypothesis (see step 620). If the fingers are vertically aligned, at step 610 the gesture recognition module 240 may determine whether one of the fingers is in a dampened area of the touch-sensitive input device 210 (e.g., a narrow band at the bottom of the surface of the touch-sensitive input device 210).

According to one aspect, the dampened area may be a location on the touch-sensitive input device 210 with decreased sensitivity or a location that is suspected of detecting contact that is unintentional. For example, if one finger is in the dampened area (e.g., the narrow band at the bottom of the input device 210), the finger may be an errant thumb or palm that is in contact with the input device 210 and the user may be intending a pointer gesture with the other finger. Accordingly, at step 615, the gesture recognition module 240 may report a pointer gesture determination. If a finger is not in a dampened area, further analysis may be necessary.

At step 620, the gesture determination module 240 may analyze a previous frame of data and calculate a degree of movement for each finger (e.g., the displacement of each finger or the distance each finger moved from one frame of data to the next). In other implementations, however, the degree of movement for each finger may be determined based on a next frame of data, instead of the previous frame of data. The finger with the most movement or displacement may be labeled the "major" finger and the finger with less movement or displacement may be labeled the "minor" finger.

The gesture recognition module 240 may also calculate the displacement of the major finger in the X-coordinate or horizontal direction (e.g., Major(X)), the displacement of the major finger in the Y-coordinate or vertical direction (e.g., Major(Y)), the displacement of the minor finger in the X-coordinate or horizontal direction (e.g., Minor(X)), and the displacement of the minor finger in the Y-coordinate or vertical direction (e.g., Minor(Y)). The gesture recognition module 240 may also determine which axis (the horizontal X axis or the vertical Y axis) most of the major finger movement is in (e.g., MajorAxis( ) which returns X or Y depending on which axis the major finger movement is along) and which axis most of the minor finger movement is in (e.g., MinorAxis( ), which returns X or Y depending on which axis the minor finger movement is along).

The displacement may be measured in positive or negative values depending on the direction of finger movement. As a result, in order to determine the absolute displacement (e.g., movement) of a finger, an Abs(N) function may be used, where Abs(N) returns the absolute value of value N (e.g., the value of N without the sign (+ or −)). In one aspect, Abs(N) may be computed by squaring N, then taking the positive square root of the result. For example, Abs(5) is 5 and the Abs(−5) is also 5.

At step 625, the gesture determination module 240 may determine whether the major finger or the minor finger is in a dampened area of the touch-sensitive input device 210 (e.g., the narrow band at the bottom of the touch-sensitive input device 210). If no finger is in the dampened area, at step 640, the gesture recognition module 240 may determine whether the distance the major finger moved along its main axis of movement (Abs(Major(MajorAxis( )))) is more than a threshold amount (LargeThresh).

As discussed above, MajorAxis( ) returns X or Y depending on which axis the most of the major finger movement is along. As a result, if MajorAxis( ) is X, Major(MajorAxis( )) is equivalent to the distance the major finger has travelled in the X direction or Major(X). Abs(Major(MajorAxis( ))) is the absolute value of this value.

If the distance the major finger moved along its main axis is more than the threshold amount (LargeThresh), the gesture recognition module 240 may determine that the user most likely intends for the finger movement to be a scroll gesture and may, at step 645, report a scroll gesture determination. If the distance the major finger moved along its main axis is not more than the threshold amount (LargeThresh), the gesture recognition module 240 may determine that the user most likely intends for the finger movement to be a pointer gesture and may, at step 615, report a pointer gesture determination.

Referring back to step 625, if a finger is in the dampened area, the gesture recognition module 240 may determine, at step 630, whether the minor finger is stationary. To determine whether the minor finger is stationary, the gesture recognition module 240 may determine if the distance the minor finger moved along the main axis of movement for the major finger (Abs(Minor(MajorAxis( )))) is more than a threshold amount (SmallThresh).

As discussed above, MajorAxis( ) returns X or Y depending on which axis the most of the major finger movement is along. As a result, if MajorAxis( ) is X, Minor(MajorAxis( )) is equivalent to the distance the minor finger has travelled in the X direction or Minor(X) and Abs(Minor(MajorAxis( ))) is the absolute value of this value.

If the distance the minor finger moved along the main axis of the major finger is not more than the threshold amount (SmallThresh), the gesture recognition module 240 may determine that since the minor finger did not move more than the threshold amount, it may be an errant or stationary finger, palm, or other object. Accordingly, the user most likely intends for the finger movement to be a pointer gesture and, at step 615, the gesture recognition module 240 may report a pointer gesture determination.

If the distance the minor finger moved along the main axis of the major finger is more than the threshold amount (SmallThresh), at step 635, the gesture recognition module 240 may determine whether the major finger and the minor finger are moving in the same general direction. For example, the gesture recognition module 240 may calculate whether (Minor(MajorAxis))*(Major(MajorAxis)) is >0. Using this calculation, if both fingers are moving in the same direction the resulting product would be greater than 0.

If the major finger and the minor finger are not moving in the same general direction (e.g., if (Minor(MajorAxis))*(Major(MajorAxis)) is not >0), the gesture recognition module 240 may determine that it is more likely that the user intends to make a pointer gesture and may, at step 615, report a pointer gesture determination.

If the major finger and the minor finger are moving in the same general direction (e.g., if (Minor(MajorAxis))*(Major(MajorAxis)) is >0), the gesture recognition module 240 may, at step 640, determine whether the distance the major finger moved along its main axis (Abs(Major(MajorAxis))) is more than a threshold amount (LargeThresh).

If the distance the major finger moved along its main axis is more than the threshold amount (LargeThresh), the gesture recognition module 240 may determine that the user most likely intends for the finger movement to be a scroll gesture and report the scroll gesture determination at step 645. If the distance the major finger moved along its main axis is not more than the threshold amount (LargeThresh), the gesture recognition module 240 may determine that the user most likely intends for the finger movement to be a pointer gesture and report the pointer gesture determination at step 615.

In one scenario, a user may perform a pointer gesture with at least two fingers and the gesture recognition module 240 may determine the current movement state to be a pointer gesture. The user may keep both fingers, which are close in proximity to one another, on the input device 210. Later, the user may intend to initiate a scroll event by simply moving the fingers already on the input device 210 together in a scroll gesture. According to one aspect, where the state change events include only by a changes in the number of fingers detected or in the particular fingers detected, the reported gesture may remain the pointer gesture.

However, in an additional aspect, a state change event may include a predetermined period of time elapsing with little or no movement being detected by the input device 210 (e.g., detected finger movement does not exceed a threshold amount of movement). As a result, even if the user does not add or remove any fingers onto the input device 210, the gesture recognition module 240 may be configured to reset and recalculate the gesture and determine that the user intents a scroll gesture.

Although various aspects of the subject technology are described with respect to touch-sensitive input devices (e.g., touchpad or touch-sensitive display) and finger movements, other movement-sensitive input devices (e.g., motion detectors, stylus pens and interfaces, game controllers, etc.) used to detect other types of movement may also be used.

Figure 7:
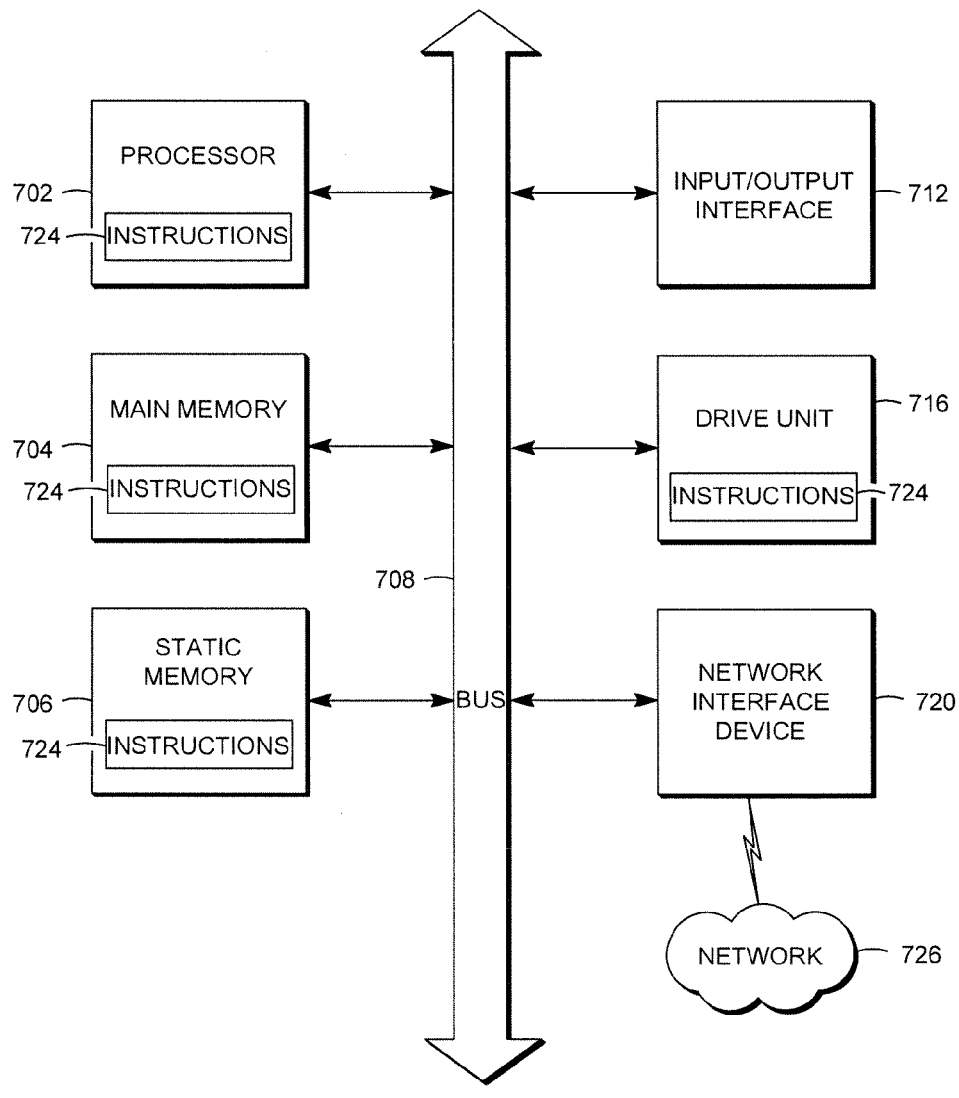
FIG. 7 is a block diagram illustrating an example computer system with which any of the systems described herein may be implemented.

FIG. 7 is a block diagram illustrating an example computer system 700 with which any of the systems described herein may be implemented. In certain aspects, the computer system 700 may be implemented using hardware or a combination of software and hardware, either in a dedicated server, or integrated into another entity, or distributed across multiple entities.

The example computer system 700 includes a processor 702, a main memory 704, a static memory 706, a disk drive unit 716, and a network interface device 720 which communicate with each other via a bus 708. The computer system 700 may further include an input/output interface 712 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 702 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 724 embodying any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media. The instructions 724 may further be transmitted or received over a network 726 via the network interface device 720.

The machine-readable medium may be a single medium or multiple media (e.g., a centralized or distributed database, and/or associated caches and servers) that store the one or more sets of instructions. The machine-readable medium may comprise the drive unit 716, the static memory 706, the main memory 704, the processor 702, an external memory connected to the input/output interface 712, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method for determining a gesture on a touch-sensitive input device, the method comprising:
   starting a delay period in response to a state change event;
   receiving at least one frame of data comprising information from a touch-sensitive input device;
   analyzing the information in the at least one frame of data to determine an initial gesture determination between either a pointer gesture or a scroll gesture, wherein the pointer gesture includes a movement that is intended to move a pointer in a graphical user interface and the scroll gesture includes a movement that is intended to move a user interface element across a screen or window;
   reporting the initial gesture determination to start to perform an initial gesture between either the pointer gesture or the scroll gesture in response to the initial gesture determination, wherein the initial gesture determination is based on analyzing the information in the at least one frame of data including a number of fingers, a capacitance area for each of the number of fingers, a distance between the number of fingers and movement of the number of fingers detected by the touch-sensitive input device;
   receiving at least one additional frame of data; and
   reporting a final gesture determination when the delay period expires to continue to perform the initial gesture or to perform a different gesture or no gesture in response to the final gesture determination, wherein the final gesture determination is based on the at least one additional frame of data including the number of fingers, the capacitance area for each of the number of fingers, the distance between the number of fingers and the movement of the number of fingers detected by the touch-sensitive input device.

2. The computer-implemented method of claim 1, wherein the final gesture determination is one of a pointer gesture, a scroll gesture, or no gesture.

3. The computer-implemented method of claim 1, wherein the delay period is measured by a number of frames.

4. The computer-implemented method of claim 1, wherein the information from the touch-sensitive input device is derived from contact between one or more appendages and a surface of the touch-sensitive input device.

5. The computer-implemented method of claim 1, wherein the state change event comprises at least one of a change in the number of fingers detected by the touch-sensitive input device, a change in the fingers detected by the touch-sensitive input device, and no state change event being detected for a period of time.

6. The computer-implemented method of claim 1, further comprising making the final gesture determination.

7. The computer-implemented method of claim 6, wherein the final gesture determination is made further based on an alignment of the number of fingers detected by the touch-sensitive input device.

8. The computer-implemented method of claim 1, wherein the touch-sensitive input device is a touchpad.

9. A system for determining a gesture on a touch-sensitive input device, the system comprising:
   one or more processors; and
   a machine-readable medium comprising instructions stored therein, which when executed by the one or more processors, cause the one or more processors to perform operations comprising:
   starting a delay period in response to a state change event;
   receiving at least one frame of data comprising information from a touch-sensitive input device;
   analyzing the information in the at least one frame of data to determine an initial gesture determination between either a pointer gesture or a scroll gesture, wherein the pointer gesture includes a movement that is intended to move a pointer in a graphical user interface and the scroll gesture includes a movement that is intended to move a user interface element across a screen or window;
   reporting the initial gesture determination to start to perform an initial gesture between either the pointer gesture or the scroll gesture in response to the initial gesture determination, wherein the initial gesture determination is based on analyzing the information in the at least one frame of data including a number of fingers, a capacitance area for each of the number of fingers, a distance between the number of fingers and movement of the number of fingers detected by the touch-sensitive input device;
   receiving at least one additional frame of data; and
   reporting, subsequent to the reporting of the initial gesture determination, a final gesture determination when the delay period expires to continue to perform the initial gesture or to perform a different gesture or no gesture in response to the final gesture determination, wherein the final gesture determination is based on the at least one additional frame of data including the number of fingers, the capacitance area for each of the number of fingers, the distance between the number of fingers and the movement of the number of fingers detected by the touch-sensitive input device.

10. The system of claim 9, further comprising the touch-sensitive input device configured to detect contact between one or more appendages and a surface of the touch-sensitive input device.

11. The system of claim 9, wherein the final gesture determination is one of a pointer gesture, a scroll gesture, or no gesture.

12. The system of claim 9, wherein the starting of the delay period comprises initializing a timer that measures a predetermined amount of time.

13. The system of claim 9, wherein the state change event comprises at least one of a change in the number of fingers detected by the touch-sensitive input device, a change in the fingers detected by the touch-sensitive input device, and no state change event being detected for a period of time.

14. The system of claim 9, wherein the operations further comprise making the final gesture determination further based on an alignment of the number of fingers detected by the touch-sensitive input device.

15. The system of claim 9, wherein the touch-sensitive input device is a touchpad.

16. The system of claim 9, wherein the touch-sensitive input device is a touch-sensitive display.

17. A machine-readable medium comprising instructions stored therein, which when executed by a machine, cause the machine to perform operations comprising:
   receiving at least one frame of data comprising information from a input device;
   analyzing the information in the at least one frame of data to determine an initial gesture determination between either a pointer gesture or a scroll gesture, wherein the pointer gesture includes a movement that is intended to move a pointer in a graphical user interface and the scroll gesture includes a movement that is intended to move a user interface element across a screen or window;

reporting the initial gesture determination to start to perform an initial gesture between either the pointer gesture or the scroll gesture in response to the initial gesture determination, wherein the initial gesture determination is based on analyzing the information in the at least one frame of data including a number of fingers, a capacitance area for each of the number of fingers, a distance between the number of fingers and movement of the number of fingers detected by the touch-sensitive input device;

receiving at least one additional frame of data; and reporting, subsequent to the reporting of the initial gesture determination, a final gesture determination to continue to perform the initial gesture or to perform a different gesture or no gesture in response to the final gesture determination including the number of fingers, the capacitance area for each of the number of fingers, the distance between the number of fingers and the movement of the number of fingers detected by the touch-sensitive input device.

18. The machine-readable medium of claim 17, wherein the operations further comprise:

starting a delay period in response to a state change event; and wherein the reporting of the final gesture determination occurs after the delay period expires.

19. The machine-readable medium of claim 17, wherein the input device is a movement-sensitive input device.

20. The machine-readable medium of claim 17, wherein the input device is a touchpad.

* * * * *